No. 611,962. Patented Oct. 4, 1898.
S. A. HESS.
FUNNEL.
(Application filed May 15, 1897.)
(No Model.)
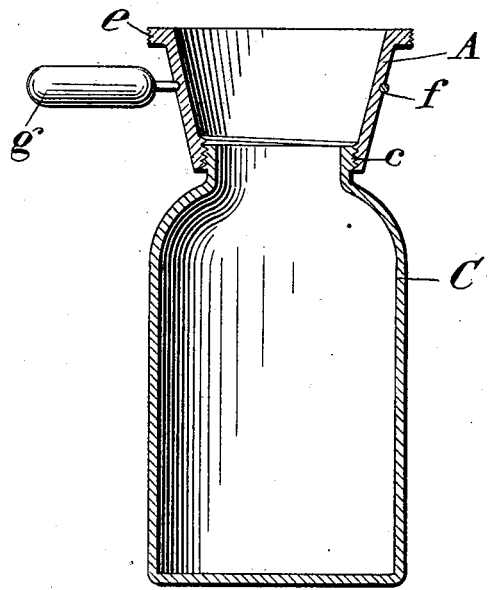
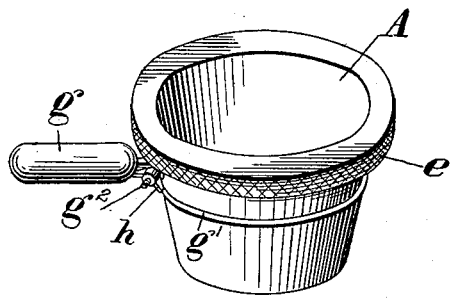
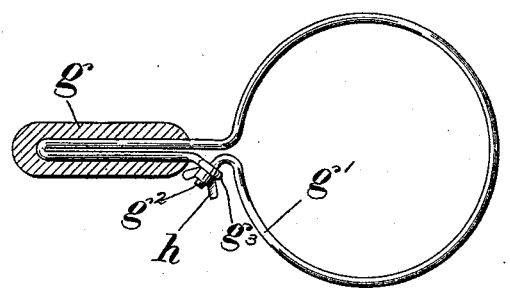
Witnesses
Chas. P. Heinemann.
Victor J. Evans.
Inventor
Sarah A. Hess.
By John Wedderburn. Attorney

UNITED STATES PATENT OFFICE.

SARAH A. HESS, OF HAYNIE, WASHINGTON.

FUNNEL.

SPECIFICATION forming part of Letters Patent No. 611,962, dated October 4, 1898.

Application filed May 15, 1897. Serial No. 636,775. (No model.)

*To all whom it may concern:*

Be it known that I, SARAH A. HESS, of Haynie, in the county of Whatcom and State of Washington, have invented certain new and useful Improvements in Funnels; and I do hereby declare the following to be a full, clear, and exact description of the invention, such as will enable others skilled in the art to which it appertains to make and use the same.

This invention relates to certain new and useful improvements in funnels, the object being to provide a special construction of funnel adapted for attachment to fruit-jars and to be employed for filling fruit into the same.

The ordinary form of glass funnel is not adapted for use in connection with filling hot fruit into the jars, for the reason that the stem thereof is too narrow to allow the cooked fruit to regularly pass through it, the funnel frequently when hot fruit is poured thereinto being heated to such an extent as to render it both inconvenient and uncomfortable for a person to handle it. In order to overcome these objections, I have provided a funnel of improved construction having a comparatively wide discharge end provided on the interior with threads adapted to engage the threads on the upper end of the jars, whereby the funnel is supported on the jar during the operation of filling the same, the said jar also being provided with an improved construction of handle, whereby it may be handled in order to move it without inconvenience or annoyance arising from its being heated by contact with the hot fruit.

My invention also consists of certain other details of construction and arrangements of parts, all of which will be hereinafter more fully described, and specifically set forth in the appended claims.

In the accompanying drawings, Figure 1 is a vertical sectional view showing my improved funnel attached to a fruit-jar. Fig. 2 is a perspective view of the funnel and the handle attached thereto, and Fig. 3 is a top view showing in detail the construction of the handle.

Referring to the drawings, the letter A designates the funnel, which may be constructed of any suitable material, but preferably of glass. The lower end of this funnel is comparatively wide and is provided on the interior thereof with screw-threads adapted to engage with the screw-threads $c$ on the mouth of the fruit-jar C and whereby it is supported thereon during the operation of filling the jar with fruit. The mouth or the top of the funnel may have an enlargement $e$, which may be milled or corrugated in order to insure that the fingers or the hand may readily grasp the same after securing the funnel onto the fruit-jar.

I have provided a novel construction of handle whereby the funnel may be supported without danger of the hands of the operator being burned by contact with the hot funnel or of breaking the said funnel by contact with the hands of the operator which may have been brought into contact with the cool water. To this end I have provided the exterior of the funnel with circumferential grooves $f$, to which the said handle is applied. This handle comprises a wooden hand-piece $g$ and a wire loop made of a single piece of wire, one end of which is doubled and inserted in the wood handle, said wire extending from the handle to form the bent loop $g'$, which extends around the body of the funnel and occupies the circumferential groove. One free end $g^2$ of the wire extends through the opening in the other free end $g^3$ and is provided with screw-threads at its end. The thumb-nut $h$ is adapted to engage the said threaded ends, by means of which the loop may be drawn tightly and caused to bind against the body of the funnel, and thereby securely attach the handle thereto.

My invention provides a simple, cheap, and effective construction of funnel for this special purpose, to which the ordinary funnel, as before stated, is not adapted.

My invention while permitting the fruit to pass freely into the jars does not allow the same to become choked up therein, and should the funnel become heated by the hot fruit it may be readily handled by the wooden handle without danger of breakage or of burning the hands of the operator, as before described.

Having thus described my invention, what I claim as new, and desire to secure by Letters Patent is—

1. A funnel having a circumferential groove, in combination with a handle including a wire loop adapted to embrace said funnel and fit within said groove, and means for adjusting the size of said loop.

2. A handle for funnels and the like, made of wire bent back upon itself forming the handle proper, and having a loop formed in it, one end of said wire having an opening in it and the other end extending through said opening and provided with screw-threads, and a thumb-screw thereon.

3. A funnel for fruit-jars comprising a funnel-body having a comparatively wide mouth and a comparatively wide discharge end, screw-threaded internally to engage the screws on the fruit-jars and provided with an exterior circumferential groove, a handle having a wooden handpiece and a wire loop extending round the body of the bottle and occupying said circumferential groove, the free end of said loop being threaded to pass through the opposite end of the wire, and a thumb-screw on the said threaded eye whereby the loop may be drawn so as to tightly insert the funnel-body, substantially as described.

In testimony whereof I have signed this specification in the presence of subscribing witnesses.

SARAH A. HESS.

Witnesses:
VIOLA BURGESS,
H. I. DAWSON,
VIRGIL PERINGER.